United States Patent [19]

Long

[11] Patent Number: 4,978,445

[45] Date of Patent: Dec. 18, 1990

[54] AERATION CHAMBER FOR A SEWAGE TREATMENT SYSTEM

[76] Inventor: Sam Long, 3046 N. 40th St., Kansas City, Kans. 66104

[21] Appl. No.: 475,764

[22] Filed: Feb. 6, 1990

Related U.S. Application Data

[63] Continuation of Ser. No. 113,062, Oct. 26, 1987, abandoned.

[51] Int. Cl.$^5$ .............................................. C02F 3/14
[52] U.S. Cl. ................................. 210/195.3; 210/199; 210/202
[58] Field of Search ................................ 210/620–629, 210/426, 170, 195.1, 195.3, 199, 202, 201, 219, 255

[56] References Cited

U.S. PATENT DOCUMENTS

| | | | |
|---|---|---|---|
| 3,168,465 | 2/1965 | Kraus et al. | 210/7 |
| 3,312,346 | 4/1967 | Walker | 210/195 |
| 3,400,822 | 9/1968 | McKeown | 210/195 |
| 3,505,212 | 4/1970 | Huber | 210/197 X |
| 3,649,529 | 3/1972 | Walker | 210/226 X |
| 3,728,254 | 4/1973 | Carothers | 210/195 X |
| 3,730,881 | 5/1973 | Armstrong | 210/202 X |
| 3,730,882 | 5/1973 | Levin et al. | 210/6 |
| 3,756,946 | 9/1973 | Levin et al. | 210/6 |
| 3,759,495 | 9/1973 | Boler et al. | 210/242 |
| 3,853,764 | 12/1974 | Armstrong | 210/202 X |
| 3,897,334 | 7/1975 | Murphy | 210/199 |
| 4,029,575 | 6/1977 | Bykowski et al. | 210/202 X |
| 4,035,296 | 7/1977 | Armstrong | 210/151 |
| 4,199,452 | 4/1980 | Mandt | 210/926 X |
| 4,200,524 | 4/1980 | Levin | 210/5 |
| 4,206,047 | 6/1980 | Mandt | 210/7 |
| 4,246,099 | 1/1981 | Gould et al. | 210/603 |
| 4,276,174 | 6/1981 | Breider et al. | 210/613 |
| 4,370,235 | 1/1983 | Suzuki et al. | 210/620 |
| 4,394,268 | 7/1983 | Reid | 210/629 |
| 4,430,224 | 2/1984 | Fuchs | 210/627 |
| 4,460,471 | 7/1984 | Reid | 210/629 |
| 4,643,830 | 2/1987 | Reid | 210/629 |
| 4,663,044 | 5/1987 | Goronszy | 210/624 |

FOREIGN PATENT DOCUMENTS 61-125493  6/1986  Japan ................................ 210/926

OTHER PUBLICATIONS

Grady, Jr. et al., "*Biological Wastewater Treatment Theory and Applications*," Marcel Dekker, Inc., New York, pp. 85–100 (1980).

Curi et al. *Theory and Practice of Biological Wastewater Treatment*, Sijthoff & Noordhoff, Germantown, MD, pp. 261–272 (1980).

*Primary Examiner*—Tom Wyse
*Attorney, Agent, or Firm*—D. A. N. Chase; Joan O. Herman

[57] ABSTRACT

An activated-sludge sewage treatment plant employs a hybrid aeration chamber comprising a primary, complete-mix section to which sewage influent and recycle sludge are introduced and treated by aeration and mixing sufficient to provide an effluent having biological oxygen demand in the range of approximately 15 to 75 parts per million, and a secondary hydraulic plug-flow section which receives the effluent. In the secondary section the effluent is treated by incrementally introducing air thereto as the same flows through the secondary section to progressively reduce the biological oxygen demand and thereby provide a final, treated effluent having a biological oxygen demand of approximately 5 parts per million.

7 Claims, 1 Drawing Sheet

AERATION CHAMBER FOR A SEWAGE TREATMENT SYSTEM

This application is a continuation of application Ser. No. 113,062, filed 10/26/87, now abandoned.

BACKGROUND OF THE INVENTION

This invention relates to improvements in activated-sludge sewage treatment systems. The invention further relates to an activated-sludge sewage treatment system with a hybrid aeration chamber comprising a primary, complete mixing section and a secondary, hydraulic plug-flow section. The invention especially relates to an activated-sludge sewage treatment system which provides treated effluent having a biological oxygen demand ("BOD") of approximately five parts per million ("ppm") without tertiary treatment.

Sewage treatment processes reduce undesirable or offensive waste from water. Primary sewage treatment removes solids from the water by using screens, grit chambers, skimming tanks and sedimentation basins. Secondary sewage treatment generally is preceded by primary treatment. It is a process whereby a biological treatment system rapidly breaks down organic material. Tertiary sewage treatment follows secondary treatment, and treats the effluent of the secondary treatment to further reduce the organic material from the water.

The activated-sludge sewage treatment system is a commonly used form of secondary treatment. It uses biologically active growths as a means to process raw sewage into relatively clean water. This microbiological culture is mixed with raw sewage (or the effluent of a primary clarifier) in a basin or chamber. Aeration means supply sufficient air to promote consumption of the colloidal and soluble organic matter (i.e. biologically degradable waste) in the sewage by the culture. When the microbes feed upon the organic matter in the sewage, they generate a biological mass of microorganisms (referred to as "activated sludge"), along with carbon dioxide, water, nitrogen compounds and traces of other components When substantially all of the colloidal and soluble organic matter has been converted into insoluble microbes and innocuous by-products, the mixture is directed to a clarifier, or secondary settling tank, which separates the relatively clean water, or finally treated effluent, from the microbes and allows the clean water to be decanted. The finally treated effluent is then released into a river or intermittent stream. A substantial portion of the activated sludge is recycled to the aeration basin, while a portion of sludge is continuously withdrawn to avoid excessive accumulation of recycled sludge.

For this system to produce a good quality of treated sewage, the decantation step must remove more than 99% of the solids from the feed mixture. Occasionally the microbiological growth produces a filamentous mycelium which settles very slowly, if at all. Filamentous mycelia in the effluent of the aeration chamber make it impossible to get a good quality of treated sewage from the decanter (clarifier). This filamentous growth is caused by various factors, but most often by too much or too little air. Penury dictates that if there is an inbalance of oxygen demand and oxygen supply, the error will almost always be a short oxygen supply. Once a filamentous growth starts, it is difficult to suppress. In a large aeration basin with an adequate air supply, it is possible to have localized areas of oxygen starvation which invite filamentous growth. The designing engineer must avoid this pitfall.

Traditionally the aeration basin has been a long, narrow chamber designed to promote plug hydraulic flow. Typical dimensions are from 20 feet by 200 feet to 40 feet by 1,000 feet, with a water depth of 12 feet to 18 feet. For economy of land use and of construction costs, the longer chambers are usually built in three parallel sections with a common wall between sections. The plug hydraulic flow of the mixed liquor through the aeration basin insures the maximum reduction of pollutants in the clarified effluent, while maintaining a high rate of oxygen usage throughout most of the chamber volume. In fact, one of the problems with the plugflow aeration basin is the tendency to grow filamentous mycelia in spots of localized oxygen starvation.

In 1980 in Suwa City, Japan, a shake-down operation was conducted in a new, partially-completed sewage-treatment plant. An aeration chamber 5 meters wide, 5 meters deep, and 60 meters long (operating in a plug-flow hydraulic mode) was treating some 8,000 metric tons per day of domestic sewage with 10 ppm to 80 ppm of BOD, and consistently producing an effluent containing 3 ppm BOD and 7 ppm of suspended solids. In this test run, the recycle rate was 100% (the volume of water with activated sludge returned to the inlet of the aeration basin was equal to the volume of the treated, clarified water discharged to the public stream). There was de facto flow equalization, and uniform aeration was used the length of the basin to give 3 ppm of dissolved oxygen at the discharge end. By calculation it is seen that the rate of BOD dissipation was some 15 lbs per day per 1,000 cubic feet of aeration chamber volume, which would make this operation too costly for most municipalities.

Within the past thirty years, an alternate type of aeration basin, the complete-mix system, has come into use. In this aeration basin, the incoming sewage and recycle sludge are rapidly mixed with a large volume of partially-treated sewage, and the entire contents of the chamber are mixed continually. In this way all mycelial growth occurs in a liquor with a BOD little higher than that of the treated effluent, and it is easy to avoid filamentous growth due to localized oxygen starvation. The claimed advantages of the complete-mix over the plug-flow aeration chamber are:

1. Lower cost of construction per unit volume of aeration chamber.
2. Ease of design and operation to avoid local areas of oxygen starvation (which promote the growth of filamentous mycelia).
3. Nitrification and denitrification occur simultaneously in the complete-mix basin, thereby reducing the amount of nitrogen compounds in the plant effluent.
4. Ease of adding more aeration capacity to cope with increased loading.

The disadvantage of the complete-mix aertion chamber is that, since the mycelial growth occurs in a medium with the same level of BOD as that of the clarified effluent, any attempt to improve the quality of the effluent will drastically reduce the volumetric capacity to remove BOD.

Calculations of sewage-treatment plant capabilities are usually based on an average daily volume of sewage flow and an average content of organic pollutants, expressed as biological oxygen demand (BOD). Unfortunately, the inflow rate to a sewage-treatment plant usually varies widely over a 24-hour period. Each sewage-collection system will have its own characteristic diurnal flow pattern, but most municipal systems will have a flow pattern similar to that shown in FIG. 1. From FIG. 1, it is seen that the maximum hourly flow rate is twice the average flow rate, and the minimum hourly flow rate is half the average flow rate. Also, at periods of high flow rate, the BOD concentration of the sewage is usually higher than average. Thus, a system with a flow of 10,000,000 gallons per day of sewage with an average BOD of 200 ppm can be expected to have a maximum flow of some 800,000 gallons per hour with a BOD of 300 ppm, and a minimum flow of some 200,000 gallons per hour with a BOD of 150 ppm.

Various authorities in the field of sewage treatment have pointed out the advantage of making a wide spot in the sewage-collection system in order to provide a more constant inflow rate to the sewage-treatment plant, but neither flow-equalization nor load-equalization to the sewage-treatment plant is considered to be cost effective, and neither is often used. In a sewage-treatment plant with two or more aeration chambers operating in parallel it is not practical to put a chamber into operation and take a chamber out of service every day in order to accommodate the varying load. Some years ago there was a move to have the effluent of the aeration basin discharge over a narrow weir, so that an increased flow into the basin would raise the surface level in the basin and, due to the increased submergence of the impellers of pier-mounted surface aerators, would cause more oxygen to be absorbed by the chamber contents. This system has not been widely adopted.

In many activated-sludge sewage treatment plants in the United States, the air flow to the aeration chambers is relatively constant over a 24-hour period, and there is minimum instrumentation to adapt the air-flow rate to the BOD load. During the hours of low BOD inflow, the extra oxygen is adsorbed by the activated sludge, and during the hours of high BOD inflow, oxygen is desorbed from the sludge to supplement that being introduced by the aeration equipment. If the sewage-treatment plant has a diurnal flow pattern similar to that shown in FIG. 1, with adequate activated sludge (perhaps equal to 15 or 20 days' new growth) in the aeration basin, and has a dissolved oxygen content in the mixed liquor of 2 ppm at 9:00 a.m., the activated sludge will have enough adsorbed oxygen to supply the peak oxygen demand for biological growth. Sewage-treatment plants which use this system for controlling air flow tend to have a treated-sewage effluent with a BOD which varies widely during the day. Hopefully the average BOD for the day will meet the standards set by the U.S. Environmental Protection Agency.

In recent years there has been a trend to use computer control to better match the aeration rate to the hourly inflow rate of BOD. There is always a question as to whether the reduction of power costs for aeration and/or the improved quality of the treated effluent justify the additional aeration capacity to meet the peak load, the cost of the control equipment, and the high maintenance cost of the control system.

OBJECTS OF THE INVENTION

It is, therefore, the primary object of the present invention to provide a hybrid aeration chamber, comprising a primary complete-mix section and a secondary hydraulic plug flow section, in an activated-sludge sewage treatment system in order to economically produce a cleaner effluent (i.e. one having a lower biological oxygen demand) than a sewage treatment system which uses either the complete-mix system or the hydraulic plug-flow system independently.

It is another object of the present invention to treat influent or sewage with a higher BOD loading per unit volume than can be treated by a complete-mix system or a hydraulic plug-flow system operating separately.

It is a further object of the present invention to economically produce a finally treated effluent with a BOD of approximately 5 ppm when treating an influent having an average BOD of 200 ppm.

It is a still further object of the present invention to provide an activated-sludge sewage treatment system wherein a low BOD is achieved in a secondary treatment plant without need for tertiary treatment.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
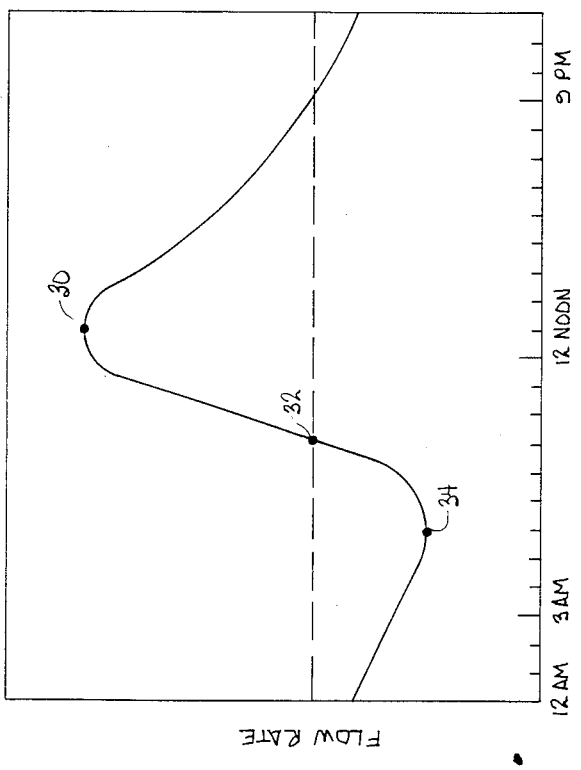
FIG. 1 is a graph showing the typical daily cycle of inflow to a municipal sewage treatment plant.

Referring to FIG. 1, the graph indicates the widely varying inflow rate to a typical municipal sewage treatment plant during a twenty-four hour period. It is seen from FIG. 1 that the maximum hourly flow rate 30 is twice the average hourly flow rate 32. Furthermore, the minimum hourly flow rate 34 is one-half the average hourly flow rate 32.

Figure 2:
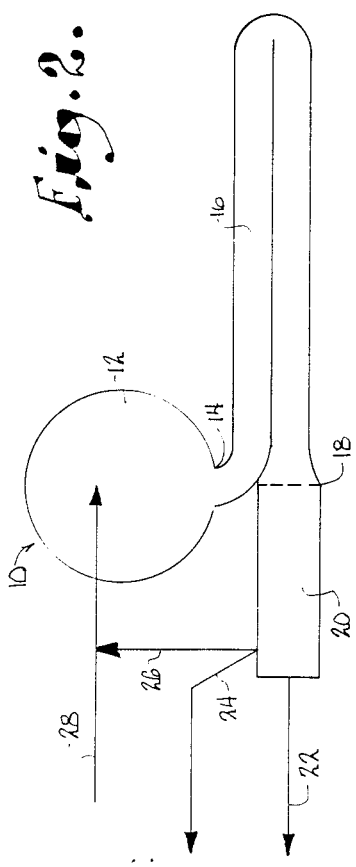
FIG. 2 is a diagrammatic, plan view of an aeration basin comprising a primary, complete-mix section, a secondary hydraulic plug-flow section, and a clarifier.

Referring to FIG. 2, a hybrid aeration chamber of an activated-sludge sewage treatment plant, generally referred to as 10, is comprised of a complete-mix aeration section 12 and a hydraulic plug-flow aeration section 16.

An inlet means 28 is sealably connected to complete-mix section 12. A connecting means 14 sealably attaches complete-mix section 12 and hydraulic plug-flow section 16. Further connecting means 18 communicates hydraulic plug-flow section 16 with a clarifier 20. Discharging means 22 and 24 are sealably connected to clarifier 20. Discharging means 22 is provided to remove finally treated effluent. Discharging means 24 operates to remove excess biological sludge. Connecting means 26 conducts recycle sludge from the clarifier 20 to inlet means 28.

Complete-mix section 12 may be circular, rectangular, hexagonal or any other convenient shape. Hydraulic plug-flow section 16 may be an elongated, relatively narrow chamber or two or more elongated, relatively narrow parallel sections connected at the ends.

Complete-mix section 12, hydraulic plug-flow section 16 and clarifier 20 may all be contained within a common sewage treatment structure, or within separate sewage treatment structures connected by a conduit.

The ratio of the volume of the hydraulic plug-flow section 16 to the volume of the complete-mix section 12 may vary over a wide range. The volume of the complete mix section 12 should be no less than ⅓ and no more than three times the volume of the hydraulic plug flow section 16. As a preferred embodiment, the volume of the complete mix section 12 is no less than ½ and no more than two times the volume of the hydraulic plug flow section 16. In a typical example, the complete-mix section 12 is 100 feet in diameter, has a water depth of 15 feet, and has a volume of 118,000 cubic feet; the hydraulic plug-flow section 16 is 500 feet by 20 feet with a water depth of 15 feet, and has a volume of 150,000 cubic feet. Existing experimental and performance data for the complete-mix aeration basin and for the hydraulic plug-flow aeration basin, operating separately, indicate that with equalization of sewage flow and computer control of air flow, this hybrid aeration chamber, with a total volume of 268,000 cubic feet, can process 10,000,000 gallons per day of sewage with some 200 ppm of BOD, and produce an effluent with 5 ppm of BOD. Thus, the aeration basin will be dissipating more than 60 pounds of BOD per day per 1,000 cubic feet of volume.

An influent is introduced into complete-mix section 12 by inlet means 28. The influent is preferably raw sewage or the effluent from a primary clarifier, along with recycled biological sludge. In complete-mix section 12, complete mixing is promoted between biologically active growths and influent in the presence of oxygen. This type of system characteristically operates with a uniform BOD concentration. Any conventional manner of aeration may be used to provide oxygen for this process. When treating influent with an average of 200 ppm of BOD and a load of 16,660 lb/day of BOD, the product of this step is a partially treated effluent with a biological oxygen demand in the range of approximately 15 to 75 ppm. Preferably, the BOD of the effluent at this stage is in the range of 20 to 40 ppm.

The partially treated effluent is discharged from the complete-mix section 12 into the hydraulic plug-flow section 16 by way of connecting means 14. The hydraulic plug-flow section is typically an elongated, relatively narrow aeration basin. The partially treated effluent is progressively aerated as the effluent flows through the chamber in a plug-flow manner and the BOD is incrementally lowered. The product of this step is a final treated effluent having a BOD of approximately 5 ppm. The combined sections can thus dissipate approximately 60 lb/day of BOD per 1000 cu. ft. of aeration chamber volume.

The final treated effluent is discharged by the hydraulic plug-flow section 16 and is then introduced into clarifier 20 through connecting means 18. The finally treated sewage is then discharged from clarifier 20 through discharging means 22. Recycled biological sludge is also discharged from clarifier 20 and is introduced into inlet means 28 through connecting means 26 for further use in complete-mix section 12, as indicated above. Discharging means 24 removes excess biological sludge from clarifier 20.

Figure 3:
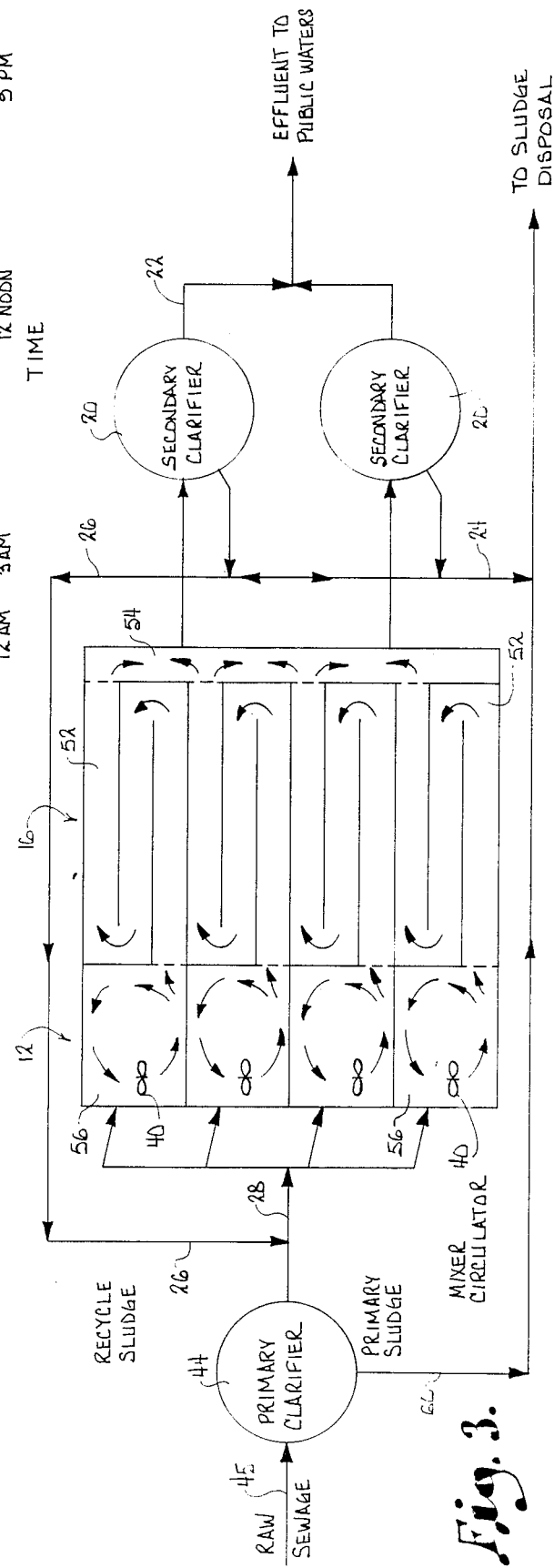
FIG. 3 is an expanded diagram illustrating a treatment plant in accordance with FIG. 2.

Referring now to FIG. 3 where a more detailed example of the system of FIG. 2 is shown, raw sewage from the wet well of the collection system is introduced into a primary clarifier 44 through inlet means 45. The sewage flows by gravitational means through the clarifier 44 allowing heavy solids to settle to the bottom of the clarifier 44 and be removed. The sewage overflow is discharged, and becomes the influent of the complete mix section 12. Discharging means 60 operate to remove the primary sludge.

The complete-mix section 12 comprises a multiplicity of parallel basins 56 into which the influent is introduced. In the complete-mix section 12, mechanical mixers or circulators within the basins 56 may be employed to continually mix the contents of the basins 56 while air is introduced into the basins 56 by conventional means (not shown). The mixers 40 are located beneath the influent level in order to cause agitation and movement of the influent, thereby promoting complete mixing of the contents of this section of the aeration basin.

The partially treated effluent from complete-mix section 12 is introduced into the hydraulic plug-flow section 16 as seen in FIG. 3 and illustrated by the arrows. The hydraulic plug flow section 16 comprises a multiplicity of serially communicated basins 52 through which the effluent flows as illustrated by the arrows. Air is introduced into each basin 52 by conventional means (not shown). The final treated effluent is ultimately discharged from an output header 54 and introduced into the secondary clarifier 20. Two secondary clarifiers 20 are provided to enable the system to operate in the event one secondary clarifier 20 must be shut down, as for maintenance purposes. The effluent of the clarifier 20 is then discharged through discharging means 22 as indicated above regarding FIG. 2. Recycle biological sludge is discharged through means 26 and introduced into inlet means 28 for further use in complete-mix section 12. Discharging means 24 removes excess biological sludge from the clarifier 20.

It is to be understood that while certain forms of this invention have been illustrated and described, it is not limited thereto, except insofar as such limitations are included in the following claims.

Having thus described the invention, what is claimed as new and desired to be secured by Letters Patent is:

1. In an activated-sludge sewage treatment plant, a hybrid aeration chamber comprising:

inlet means for introducing sewage influent into said aeration chamber;

a primary, complete-mix section sealably connected to said inlet means for receiving said sewage influent, and comprising a mixing basin, and a mixing circulator and aeration diffuser means for treating the influent by aeration and mixing sufficient to provide an effluent having a biological oxygen demand of less then 75 parts per million;

first connecting means for sealably connecting said primary, complete-mix section with a secondary, hydraulic plug-flow section, said connecting means further providing conduit means for removing said effluent from said primary section and introducing said effluent into said secondary section;

said secondary, hydraulic plug-flow section comprising an elongated, relatively narrow aeration basin and aeration diffuser means for treating the influent by introduction of air thereto and said effluent flows through said secondary section to progressively reduce the biological oxygen demand and thereby provide a final, treated effluent having a biological oxygen demand of less than 20 parts per million;

clarifier means for receiving said final, treated effluent from said secondary section and clarifying the same, and second connecting means for sealably connecting said secondary section with said clarifier means, said second connecting means further providing conduit means for removing said final, treated effluent from said secondary section and introducing said final treated effluent into said clarifier means;

first outlet means sealably connected to said clarifier means for discharging and final, treated effluent from said clarifier means; and second outlet means sealably connected to said clarifier means for discharging excess biological sludge from said clarifier means.

2. The hybrid aeration chamber as set forth in claim 1, further including recycle discharge means having ends sealably connected to and in fluid communication with said clarifier and said inlet means, said recycle discharge means further providing conduit means for removal of recycle sludge from said clarifier and introduction of said recycle sludge into said inlet means.

3. The hybrid aeration chamber as set forth in claim 1, wherein said inlet means includes means for introducing raw sewage and recycled biological sludge, said raw sewage and recycled biological sludge presenting said sewage influent.

4. The hybrid aeration chamber as set forth in claim 1, further including primary clarifier means and third connecting means for sealably connecting said primary clarifier with said inlet means, said third connecting means further providing conduit means for removing primarily clarified influent from said primary clarifier and introducing said influent into said inlet means, said inlet means introducing said primarily clarified influent and recycled biological sludge into said primary section, said primarily clarified influent and recycled biological sludge presenting said sewage influent.

5. The hybrid aeration chamber as set forth in claim 1, wherein said aeration basin of said secondary, hydraulic plug-flow section comprises a multiplicity of parallel elongated, relatively narrow chambers having ends in fluid communication and forming a serpentine path, said secondary section promoting plug hydraulic flow of said effluent therethrough.

6. In an activated-sludge sewage treatment plant, a hybrid aeration chamber comprising:

inlet means for introducing sewage influent into said aeration chamber;

primary clarifier means sealably connected to said inlet means for separating heavy solids from said sewage influent;

first connecting means for sealably connecting said primary clarifier means and a multiplicity of parallel primary sections, said first connecting means further providing a conduit for removing said influent from said primary clarifier and introducing said influent into each of said primary sections;

said primary sections each comprising means for receiving said sewage influent, a mixing basin, and a mixing circulator and aeration diffuser means for treating the influent by aeration and mixing sufficient to provide an effluent having a biological oxygen demands of less than 75 parts per million;

second connecting means for sealably connecting each of said primary sections with an associated secondary, hydraulic plug-flow section, each of said second connecting means further providing a conduit for removing said effluent from each of said associated primary sections and introducing said effluent into each of said associated secondary sections;

said secondary sections each comprising a multiplicity of parallel, elongated relatively narrow stretches having ends in fluid communication and forming a serpentine path through which said effluent flows, and aeration diffuser means for treating said effluent by introduction of air thereto as said effluent flows through said secondary sections to progressively reduce the biological oxygen demand and thereby provide a final treated effluent having a biological oxygen demand of less than 20 parts per million;

common outlet manifold means for receiving said final, treated effluent from said secondary sections, and third connecting means for sealably connecting each of said secondary sections with said manifold, said third connecting means further providing a conduit for removing said final, treated effluent from each of said secondary sections and introducing said final, treated effluent into said outlet manifold;

at least one secondary clarifier means for receiving and clarifying said effluent of said secondary sections, and fourth connecting means for connecting said outlet manifold with said secondary clarifier means, said connecting means further providing a conduit for removing said final, treated effluent from said outlet manifold and introducing said final, treated effluent into said secondary clarifier;

first outlet means sealably connected to said secondary clarifier for discharging said final, clarified effluent from said secondary clarifier; and second outlet means sealably connected to said secondary clarifier for discharging excess biological sludge from said secondary clarifier.

7. The hybrid aeration chamber as set forth in claim 6, further including recycle discharge means having ends sealably connected to and in fluid communication with said secondary clarifier and said inlet means, said recycle discharge means further providing a conduit for removing recycle sludge from said secondary clarifier and introducing said recycle sludge into said inlet means.

* * * * *

UNITED STATES PATENT AND TRADEMARK OFFICE
CERTIFICATE OF CORRECTION

PATENT NO.   : 4,978,445
DATED        : December 18, 1990
INVENTOR(S)  : Sam Long It is certified that error appears in the above—identified patent and that said Letters Patent is hereby corrected as shown below:

Claim 1, Column 7, line 4, delete [and] and substitute --said-- therein.

Claim 6, Column 8, line 3, delete [demands] and substitute --demand--.

Signed and Sealed this

Twenty-third Day of June, 1992

Attest:

DOUGLAS B. COMER

Attesting Officer     Acting Commissioner of Patents and Trademarks